(No Model.) 3 Sheets—Sheet 1.
M. J. PALSON.
MACHINE FOR SPLITTING AND CLEANING FISH.
No. 353,268. Patented Nov. 23, 1886.
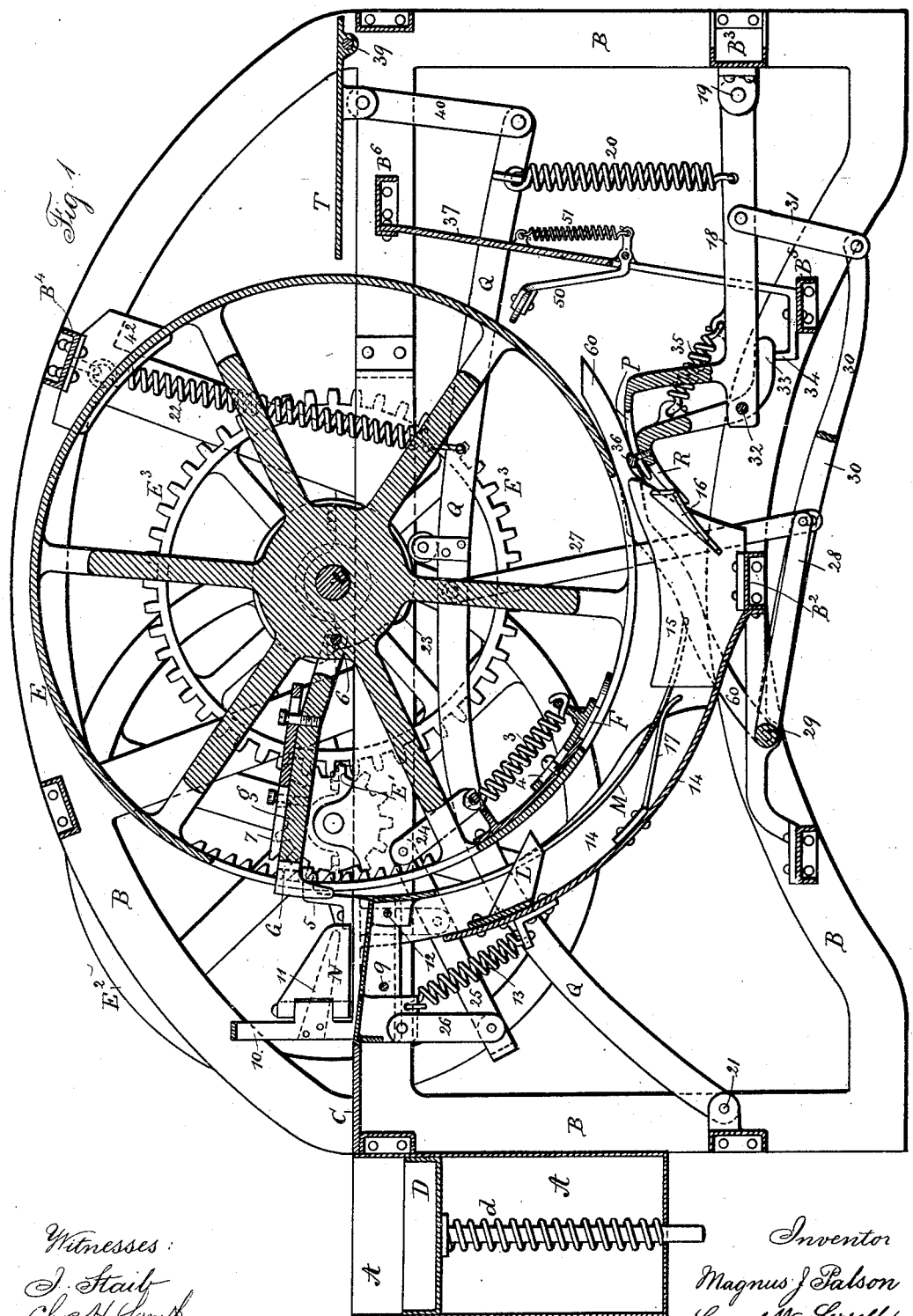
Witnesses:
J. Staib
Chr. H. Smith
Inventor
Magnus J. Palson
per Lemuel W. Serrell Atty

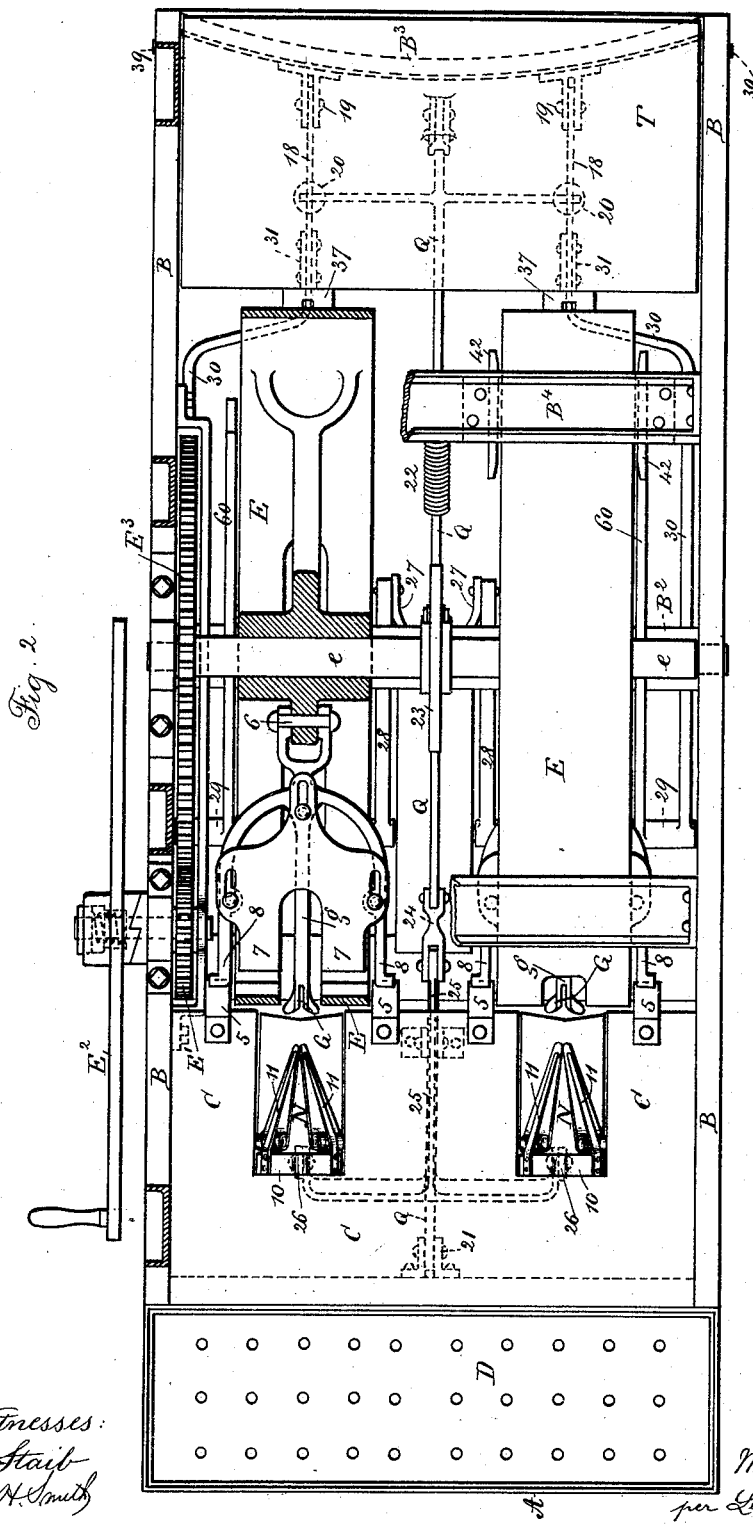

(No Model.) 3 Sheets—Sheet 3.

M. J. PALSON.
MACHINE FOR SPLITTING AND CLEANING FISH.

No. 353,268. Patented Nov. 23, 1886.

Witnesses:
J. Staib
Chas H. Smith

Inventor:
Magnus J. Palson
per Lemuel W. Serrell
atty

UNITED STATES PATENT OFFICE.

MAGNUS J. PALSON, OF ELIZABETH, NEW JERSEY, ASSIGNOR TO HIMSELF, FARMER R. WALKER, OF GLOUCESTER, MASSACHUSETTS, AND WILLIAM M. CRANE, OF ROSELLE, NEW JERSEY.

MACHINE FOR SPLITTING AND CLEANING FISH.

SPECIFICATION forming part of Letters Patent No. 353,268, dated November 23, 1886.

Application filed February 15, 1886. Serial No. 191,933. (No model.)

*To all whom it may concern:*

Be it known that I, MAGNUS J. PALSON, of Elizabeth, in the county of Union and State of New Jersey, have invented an Improvement in Machines for Splitting and Cleaning Fish, of which the following is a specification.

In my machine the fish are placed in a tank in which is a lifting-bottom to keep the fish near the surface. Each fish is passed in tail first from a feed-table through a tipping-throat, and the fish is grasped near the tail by a clamp upon a revolving wheel, a head-guide drops and steadies the fish's head while the fish is carried along against a fixed knife by which it is split through the back and laid open. A spreader-plate completes the opening operation, and the fish is carried against a gibber that removes the gibs or entrails and also the gills, and the fish is discharged upon a tip-table and thrown into a barrel or other receptacle. By my improvement the various operations are performed very rapidly and perfectly.

Figure 6:
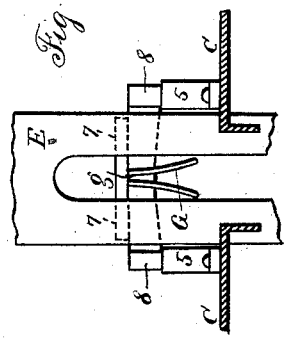
Figure 5:
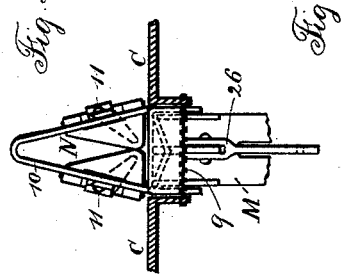
Figure 4:
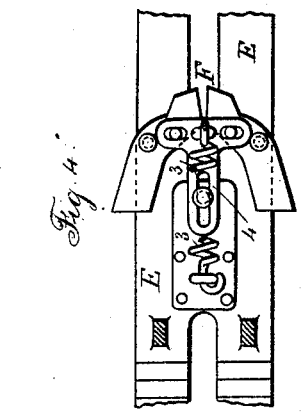
Figure 3:
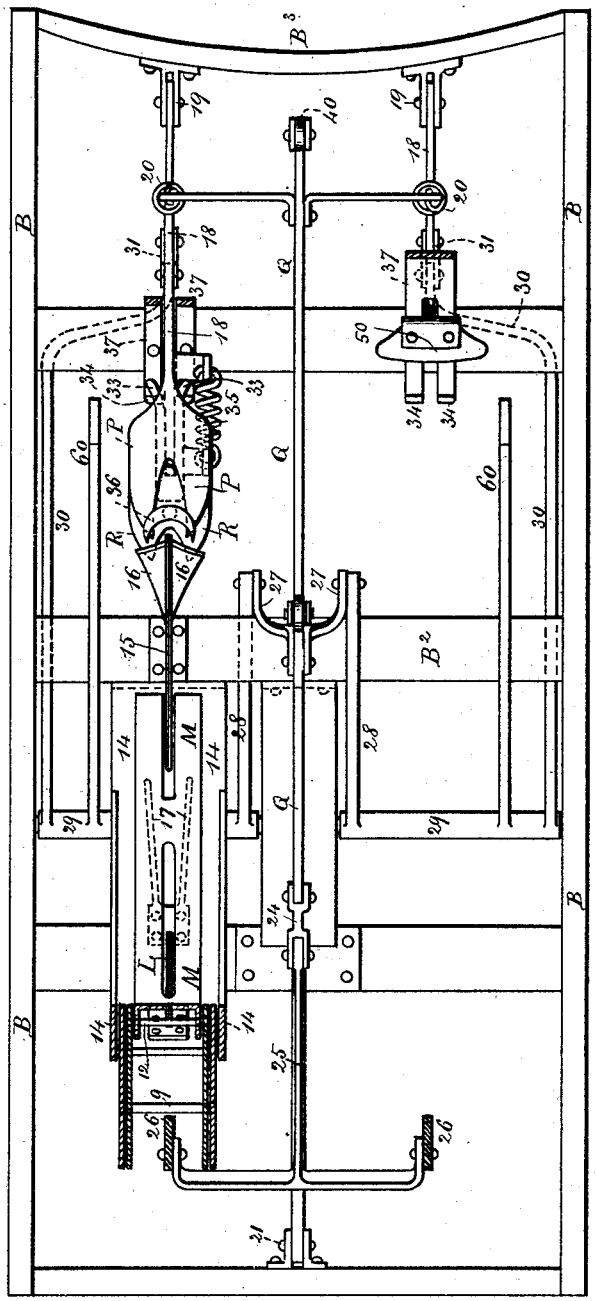

In the drawings, Figure 1 is a vertical section of the machine through one of the carrier-wheels. Fig. 2 is a plan view of the machine with one of the carrier-wheels in section. Fig. 3 is a plan of the machine with both the carrier-wheels removed, and with the knife and spring and gibber removed at one side. Fig. 4 is an elevation of the tail-clamp from the inside of the carrier-wheel. Fig. 5 is a rear view of the throat and section of the table; and Fig. 6 is a section of the table and elevation of part of the carrier-wheel and head-guide.

The tank A is supported at one end of the frames B, and the top thereof is at the level of the feed-table C, and within the tank is a lifter, D, in the form of a perforated plate, with spring $d$ beneath the same. This spring yields freely as the mass of fish is dumped into the tank; but such lifter will rise as the fish are taken out, so as to keep them up near the surface and facilitate their being grasped and fed into the machine.

The carrier-wheel E is upon a shaft, $e$, in bearings in the frames B, and it is rotated by a hand-wheel, $E^2$, and pinion $E'$, that act upon the wheel $E^3$ upon the shaft $e$. I prefer to make use of a spring clutch or pawl between the fly-wheel and the pinion to prevent the machine being revolved in the wrong direction. Usually there are two carrier-wheels in one machine. There may, however, be three, or more. As all the devices for one carrier-wheel are duplicated for the second and third or more carrier-wheels, it is only necessary to describe one such wheel and the appliances used therewith. If two carrier-wheels are made use of, the attendant may feed the fish simultaneously, one with each hand.

Upon the carrier-wheel E there are one or more pairs of tail-clamps, F, formed of two jaws pivoted upon a plate attached to the carrier-wheel and drawn toward each other by the closing-spring 3 and a slotted plate, 4, that acts against pins upon the jaws. These parts are connected with the flat broad band that composes the periphery of the wheel E, and at these clamps there is a slot into which the fish's tail is passed sufficiently for the clamps to catch and hold such tail at the end of the slot, and I make use of diverging lever ends to the clamps F, which diverging lever ends open the clamp-jaws to receive the tail at the time such tail is presented. The lever ends project at opposite edges of the perimeter of the wheel and come into contact with stationary clamp-openers 5 upon the back edge of the feed-table. The jaws close upon the fish's tail as soon as the lever ends of the clamps pass free of the openers 5; and I make use of head-guides G, in the form of converging plates, at the end of an arm, $g$, that is pivoted at 6 to the hub of the carrier-wheel E, and these head-plates and arm drop against the head of the fish to steady the same and prevent the cutting operation moving the fish to one side or the other, and upon the arm $g$ are pawls 7, that are held by pins through slots, and these pawls slip down by gravity and come into contact with teeth upon the inner face of the carrier-wheel E, so as to hold the head-guide G and prevent the same slipping away from the fish's head as the fish is carried along through the machine.

At one or both sides of the arm $g$ there are fingers 8, projecting and passing outwardly at the edge of the carrier-wheel E. The length of these fingers 8 is such that when the head-guide falls downwardly and the arm g swings upon the pivot 6, the fingers 8 will rest upon the upper end of the clamp-openers 5, and the head-guide will be supported by the same until the said fingers 8 are drawn back by the movement of the carrier-wheel E, causing the pivot 6 to describe the downward and backward arc of a circle, and when the fingers 8 clear the clamp-openers 5, the head-guide drops upon the head of the fish and the pawls 7 slide downward and hold the head-guide in place.

As before stated, the fish is presented tail first and the tail is passed into the slot in the carrier-wheel E, the clamps F being opened by the stationary parts 5, and as soon as the diverging lever ends of the tail-clamps clear said openers 5 the clamps grasp the tail, and when the fish is to be split down the back (as is usual) the belly of the fish lies against the periphery of the carrier-wheel E, and in this position the fish is presented to a stationary knife, L, which stands at an inclination to the surface of the carrier-wheel, and while splitting the fish from the tail to the head also forces the fish against the periphery of the carrier-wheel, and this action is augmented by a yielding plate, M, that is slotted longitudinally for the knife L to pass through the slot, said yielding plate tending to press the fish toward the carrier-wheel. The knife L is fastened to the case that surrounds the under side of the wheel E.

I prefer to make use of a tipping-throat, N, pivoted at 9, below the feed-table C. This throat N is made with a yoke, 10, behind which are converging springs 11, the springs being attached to said yoke, and this yoke is of a size sufficiently large for the fish to be passed through it, and the base of the tipping-throat below the yoke is trough-shaped, so that when the tail of the fish is passed through the throat and grasped by the clamps F the carrier-wheel E will draw the fish downwardly and through the yoke and between the springs, and the said throat will tip upon the pivots 9 during this operation, and cause the plate M and tipping-throat to act in conjunction upon the fish. The upper end of the plate is hinged at 12 to the tipping-throat. After the fish has passed down, the spring 13 returns the tipping-throat N to its normal position.

Beneath the carrier-wheel E is a cross-bar, $B^2$, to which the lower end of an inclosing-case, 14, is attached, and this cross-bar also carries the opener 15 and spreader 16, the opener 15 being in the form of a vertical plate and the spreader 16 in the form of inclined wings at each side of the opener. This opener 15 also forms a guide for the slotted lower end of the plate M, and there are within the case 14 springs 17, that tend to lift the plate M, so as to keep the lower end of said plate M up against the fish, and it will be now evident that the fish having been cut longitudinally by the knife L, the opener 15 and spreader 16 act jointly to lay the fish out flat, or almost so, against the carrier-wheel E, ready for the next operation—namely, the removal of the entrails or gibs and the gills.

The gibber P is in the form of curved prongs upon the end of an arm, 18, that is pivoted at 19 to the cross-piece $B^3$ of the frame, and a spring, 20, tends to lift the gibber and cause it to press against the fish as the fish is carried along over it by the wheel E.

I make use of a central lever, Q, pivoted at 21 to the frame of the machine, and said lever passes between the two carrier-wheels E, and it is connected by a spring, 22, to the cross-bar $B^4$, and this spring lifts the lever to bring a roller or projection on the lever into contact with a cam, 23, upon the driving-shaft e, and this cam is shaped to raise and lower the lever Q and parts connected with the same at the proper time, to act in harmony with the devices that grasp and move the fish, and I prefer to make use of the link 24, lever 25, and link 26 to the tipping-throat N, so that this throat will be moved at the proper time for allowing the fish to pass through the said throat.

From the lever Q a connecting-rod, 27, passes to the lever-arm 28 upon the rock-shaft 29, and 30 is an arm extending from the rock-shaft, with a link, 31, to the arm 18, so that said arm 18 and the gibber P are raised and lowered by the central lever, Q, cam 23, and spring 22. The cam gives a positive downward movement, so that the gibber P will be moved downwardly after having removed the gibs and gills, and the holder R, hereinafter described, will also receive a positive movement at the same time. This holder R is in the form of a lever pivoted at 32 upon the end of the arm 18, and having downward cam-shaped ends 33, which are brought into contact with stationary trippers 34, that project from the cross-piece $B^5$, so that these cam ends 33 swing the holder R in one direction as the gibber is drawn down, and the spring 35 swings the cleaner in the other direction as the gibber is drawn up by the spring 20. This holder R is made as a fork that swings in beneath the prongs of the gibber P, and there is a clearer, 36, upon the holder, that passes up into the slot between the prongs of the gibber, and this clearer has preferably a crescent-shaped blade on the top that lies above the top surface of the gibber.

It is now to be understood that as the fish is drawn along over the gibber the clearer 36 is moved toward the back end of the slot in the gibber, and the ends of the prongs of the gibber pass in between the body of the fish and the entrails, detaching the same, and the crescent-shaped clearer 36 aids in this operation, and the gibs wedge in between the gibber P and holder R, and as the fish is drawn farther along, the points of the gibber pass in behind the gills and they are held firmly between the parts P and R, so that they are stripped out from the fish by the further movements of the parts.

I find that the gibber P, if used alone, does not act satisfactorily, because the same is liable to cut through the gibs and gills, instead of pulling them out bodily; but when the holder R is used in addition the parts wedge in between the parts P and R, and are held by the spring 35, swinging the holder R up against such gibs and gills and clamping them, similar to grasping them by hand. The cam 23 allows the gibber to rise up against the fish at the proper time and act as aforesaid. After the fish has passed by, the gibber is pulled down by the action of the cam 23, lever Q, and connections before described, and the cam ends 33, striking against the trippers 34, cause the holder R to swing and release the gibs and gills and the clearer 36 to move forward out of the slot in the gibber and carry with it the gibs and gills, and these fall away from the gibber, and as the gibber is raised by the springs 20 and 22, the prongs of the gibber tend to push off from the clearer any gibs or gills that may adhere thereto.

A slotted frame, 37, is preferably made use of between the cross-bar B² and the cross-bar B⁴, to guide the arm 18 as it is moved up and down.

When the fish has been split open and its nose is within the head-guide, there is a risk of the gibbers catching the nose of the fish and tearing the same. To prevent this I make use of a lever-arm, 60, extending out from the rock-shaft 29 at the outer side of the carrier-wheel E, and against this the finger 8 on the head-guide G comes into contact to force down the arm 60, and by the lever 30 and arm 18 move down the gibbers, and the shape of this arm 60 is such that this movement takes place just before the gibber reaches the nose of the fish and the head-guide G. If desired, the bar g of the head-guide G may be fitted with a spring to allow the head-guide to yield inwardly.

At the back of the machine is a tip-table, T, pivoted at 39 to the frames B, and to this a link, 40, is hinged, and said link is attached to the end of the lever Q, so that when the lever Q is lifted by the spring 22 the tipping-table T is raised at its free edge and it throws the fish off of the table into a barrel or other receptacle, and the parts are so timed that the stationary tail-clip openers 42 upon the cross-bar B⁴ cause the tail of the fish to be liberated from the tail-clamps after the head of the fish has passed above the tipping-table T, so that the fish as it is liberated slides down upon the tipping-table, and then it is discharged from the tipping-table by raising its free edge. Usually it is preferable to employ a tipping-table instead of a stationary inclined table, because the tipping-table is higher than a stationary incline usually would be placed, and it is better adapted to the height of fish-barrels. As the head-guide passes across over the shaft of the carrier-wheel the pawls thereof slide down and liberate the head-guide, so that the same swings forward when the head-guide passes beyond the vertical line, and the swinging movement of the head-guide is limited by the length of the slot in the carrier-wheel through which it projects.

Upon the slotted frame 37 a scraper, 50, is to be pivoted, the end thereof that comes next to the fish being preferably rounding and formed of or covered with india rubber, and there is a spring, 51, to move the scraper toward the fish, and this aids in removing spawn and loose materials from the inner surface of the fish.

It will be apparent that this machine is adapted to different sizes of fishes, because the head-guide falls and holds the same, regardless of the length of the fish, but the machine itself can be made of any desired size adapted to fish within certain ranges of measurement.

I claim as my invention—

1. A revolving carrier-wheel provided with slots in its periphery, in combination with tail-clamps adapted to grasp the tail of the fish after it has been passed into a slot in the said carrier-wheel, a stationary inclined splitting-knife, and a gibber for removing the gills and gibs, substantially as set forth.

2. The combination, with a revolving carrier-wheel and clamps thereon for grasping the fish, of a tipping-throat to guide the fish against the wheel as it is drawn down, a knife to split the fish, and a gibber to remove the gibs and gills, substantially as set forth.

3. The combination, with the revolving carrier-wheel and the clamps for grasping the fish, of a tipping-throat having spring sides, a stationary knife to split the fish, and a yielding plate to press the fish toward the revolving wheel, substantially as set forth.

4. The combination, with the revolving carrier-wheel and the clamps on the carrier for grasping and holding the tail of the fish, of a pivoted head-guide to drop against and hold the head of the fish, substantially as set forth.

5. The tipping-throat having a pivoted base, a yoke, and converging springs, in combination with the revolving carrier, a slotted yielding plate connected to the tipping-throat, a stationary splitting-knife passing through the plate, and a table supporting the tipping-throat.

6. The combination, with the revolving carrier and clamps for grasping the fish, of a splitting-knife, a yielding plate to press the fish toward the carrier, and opener an spreader, and a gibber, substantially as set forth.

7. In a fish-cleaning machine, a gibber having prongs, in combination with a cleaner that is partially between the prongs of the gibber while seizing the gibs and gills, and mechanism, substantially as set forth, moving the cleaner and discharging the gibs, substantially as set forth.

8. The gibber formed of prongs upon a lever, in combination with a holder pivoted upon the lever of the gibber, a projection upon the holder passing up between the prongs of the gibber, and the trippers, and spring for moving the holder, substantially as set forth.

9. The combination, in a fish-cleaning machine, of a revolving carrier, a tipping-throat, a splitting-knife, an opener, a gibber, and a clearer, substantially as set forth.

10. The combination, in a fish-cleaning machine, of supply-tank having a lifter within the same, a tipping-throat, a revolving carrier, a splitting-knife, a yielding plate to press the fish toward the carrier, an opener and spreader, a gibber and clearer, and a table for delivering the fish, substantially as set forth.

11. The combination, with a revolving carrier, of a tail-clamp and a head-guide upon such revolving carrier, a gibber to remove the gibs and gills, and a lever, 60, acted upon by a projection from the head-guide to move the gibber away from the nose of the fish, substantially as set forth.

12. The gibber having prongs, in combination with a yielding holder that acts to grasp the gibs and gills, and mechanism, substantially as specified, for presenting the fish to the gibber, substantially as set forth.

13. The combination, with the revolving carrier and means for holding and splitting the fish, of the gibber and a yielding scraper, 50, substantially as set forth.

Signed by me this 2d day of February, A. D. 1886.

MAGNUS J. PALSON.

Witnesses:
DAVID W. LOW,
FARMER R. WALKER.